United States Patent [19]

Ichiki

[11] Patent Number: 5,327,953
[45] Date of Patent: Jul. 12, 1994

[54] PNEUMATIC TIRES WITH REDUCED SIDE DEPTH AT DEFINED LOCATIONS

[75] Inventor: Yasufumi Ichiki, Kodaira, Japan

[73] Assignee: Bridgestone Corporation, Tokyo, Japan

[21] Appl. No.: 914,526

[22] Filed: Jul. 17, 1992

[30] Foreign Application Priority Data

Jul. 19, 1991 [JP] Japan .................... 3-203688

[51] Int. Cl.$^5$ ............................................. B60C 11/12
[52] U.S. Cl. ............................ 152/209 R; 152/DIG. 3
[58] Field of Search ........ 152/209 R, 209 D, DIG. 3; 925/35, 46, 47, 28.1, 812, 450.1, 451.9

[56] References Cited

U.S. PATENT DOCUMENTS

| | | | |
|---|---|---|---|
| 2,779,060 | 1/1957 | Knox | 152/DIG. 3 |
| 2,848,744 | 8/1958 | Crooker | 425/28.1 |
| 3,692,090 | 9/1972 | Brobeck et al. | 425/46 |
| 3,999,907 | 12/1976 | Pappas | 425/46 |
| 4,449,560 | 5/1984 | Tansei et al. | 152/209 R |
| 4,934,424 | 6/1990 | Kojima . | |

FOREIGN PATENT DOCUMENTS

| | | |
|---|---|---|
| 0405276 | 1/1991 | European Pat. Off. . |
| 1224642 | 5/1959 | France . |
| 1203290 | 1/1960 | France .................... 425/28.1 |
| 2640913 | 6/1990 | France . |
| 62-242508 | 4/1986 | Japan . |
| 62-251205 | 4/1986 | Japan . |
| 0242508 | 10/1987 | Japan . |
| 343210 | 6/1990 | Japan . |
| 2267010 | 10/1990 | Japan .................... 152/209 D |

*Primary Examiner*—Michael W. Ball
*Assistant Examiner*—Nancy T. Krawczyk
*Attorney, Agent, or Firm*—Sughrue, Mion, Zinn, Macpeak & Seas

[57] ABSTRACT

A pneumatic tire manufactured with a sector mold including of plural arc-shaped segments each having plural island rows of ribs or blocks in its tread portion and sipes formed in at least one island row. Among these sipes, a depth of a sipe located in the vicinity of a position of a tread surface corresponding to an edge of the arc-shaped segment is made shallower than that of a sipe located at a position other than the above position.

4 Claims, 3 Drawing Sheets

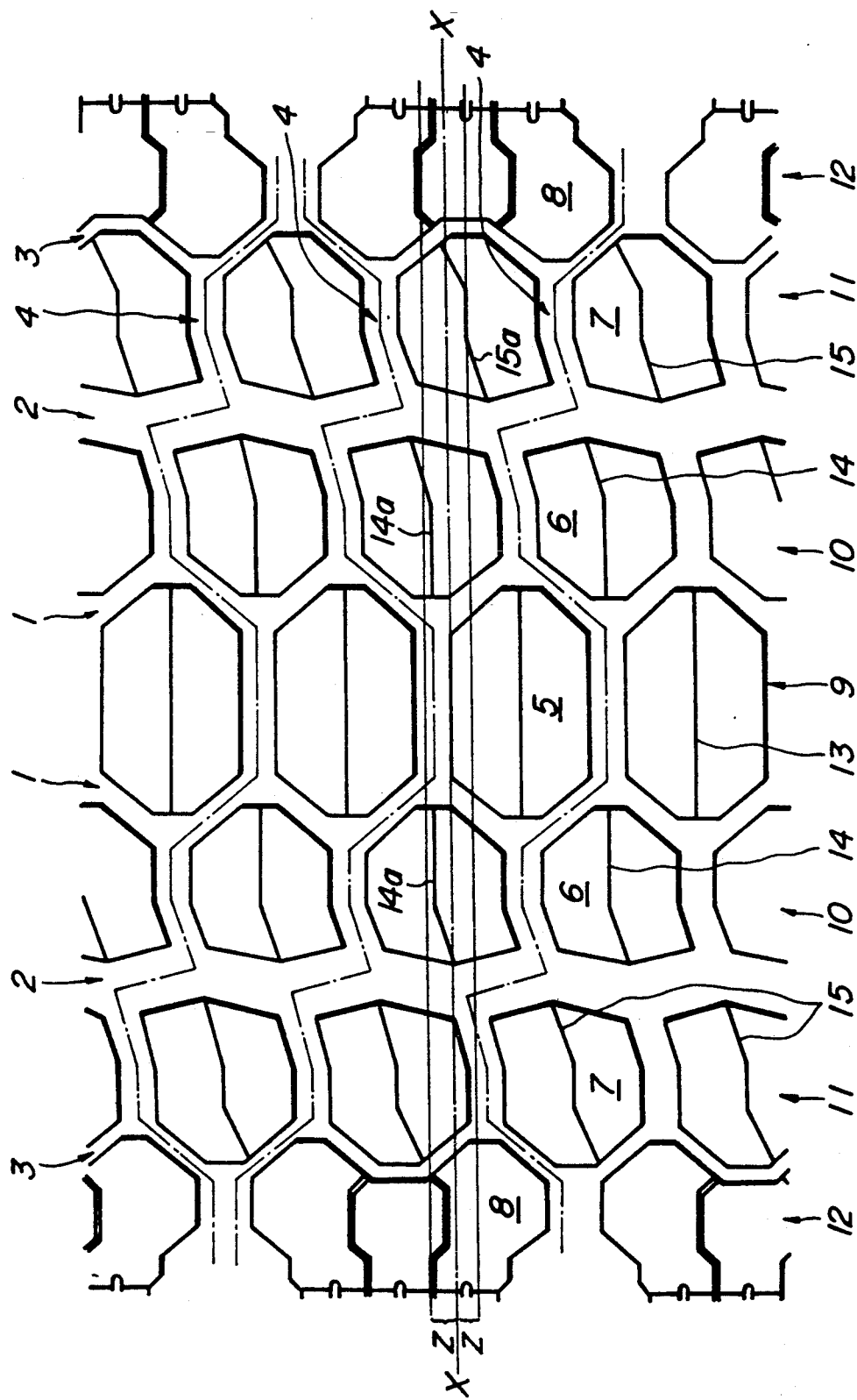

FIG._2a    FIG._2b    FIG._2c
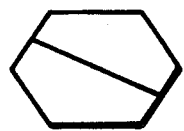 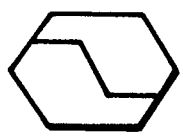 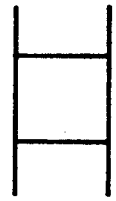
FIG._3a  FIG._3b  FIG._3c  FIG._3d
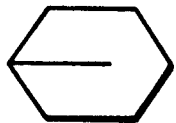  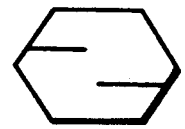 
FIG._4a    FIG._4b    FIG._4c
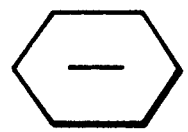 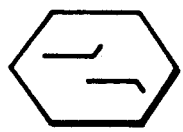 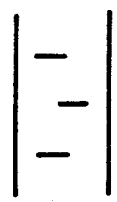

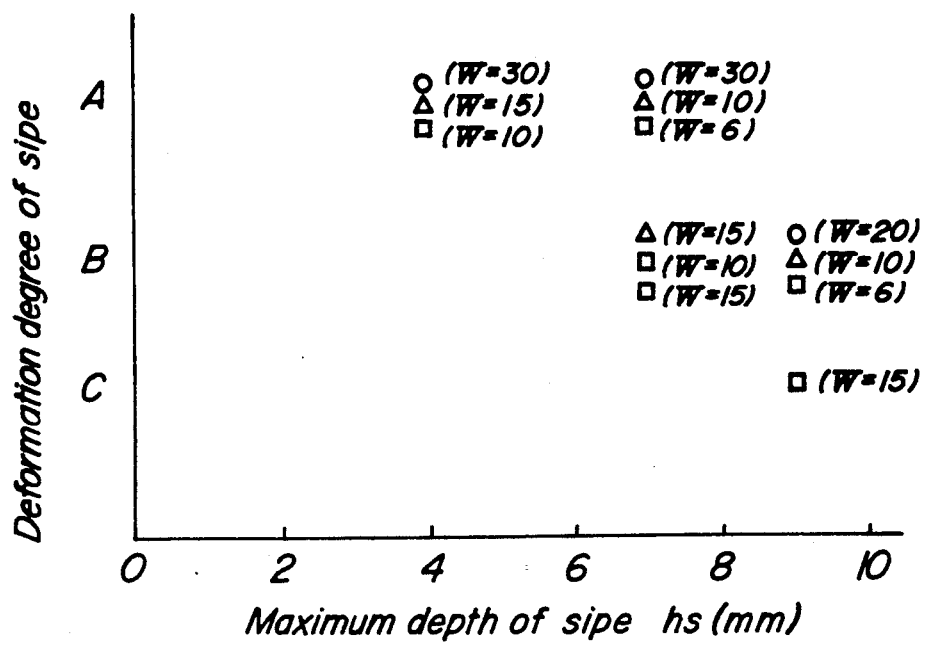
FIG_5
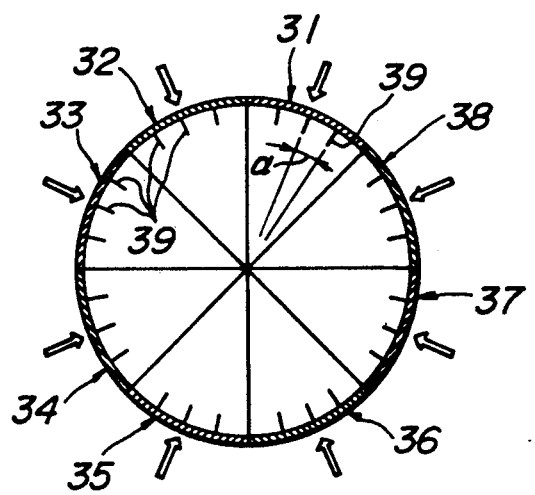
FIG_6 PRIOR ART

PNEUMATIC TIRES WITH REDUCED SIDE DEPTH AT DEFINED LOCATIONS

BACKGROUND OF THE INVENTION

1. Field of the Invention

This invention relates to pneumatic tires in which island portions of the tread have a plurality of sipes. More particularly, the present invention relates to a pneumatic tire having at a given position of its island portion a sipe of a given shape.

2. Description of the Related Art

In the manufacture of tires having sipes in their tread island portion, a sector mold consisting of plural arc-shaped segments, each of which segments being provided at its inner surface with a plurality of sipeforming blades having a desired shape and size, is usually used during the vulcanization of a green tire, in which each blade is put into the green tire based on the inward displacement of each arc-shaped segment in the radial direction to form sipes in the tire.

In the conventional technique, a sector mold consisting of eight arc-shaped segments 31-38 as shown in FIG. 6 is used in the vulcanization of the green tire. In this case, each of these segments 31-38 is moved inward in the radial direction as shown by an arrow, whereby blades 39 disposed in the inner peripheral surface of each of the segments 31-38 and equally protruding inward in the radial direction are put into the green tire. Among these blades, as the blade approaches each end side of the segment (31-38) in the peripheral direction, an angle α between the protruding direction of the blade and the moving direction of the segment becomes large and hence a relative displacement of such an end-side blade 39 with respect to the green tire in the circumferential direction of the tire becomes large, so that a large external force in the circumferential direction of the tire is applied to the end-side blade 39 during the placement of the end-side blade into the green tire. As a result, the end-side blade 39 and hence the sipe formed thereby are deformed and the end-side blade 39 is damaged. This is a problem.

In order to solve the above problem, there have been proposed a method of forming sipes at a position remote from a position of the tread surface corresponding to an edge of the arc-shaped segment (31-38), a method of removing a sipe in the vicinity of the position of the tread surface corresponding to the edge of the arc-shaped segment, and the like.

In these conventional techniques, however, a sipe does not exist in the vicinity of the position of the tread surface corresponding to the edge of the arc-shaped segment, so that the tread pattern changes at this position or general area to cause a problem of changing the performances of the tire. Moreover, according to the former technique that the sipe is formed at a position remote from the position of the tread surface corresponding to the edge of the segment, when the island portion of the tread is block, the sipes are particularly formed in the block at a one-side state in the circumferential direction of the tire, so that the rigidity of the block becomes ununiform to inversely cause the occurrence of uneven wear, and also if the length of the block in the circumferential direction of the tire is short, there is a problem that the block is broken off due to the unbalance of the sipes.

SUMMARY OF THE INVENTION

It is, therefore, an object of the invention to solve the aforementioned problems and to provide a pneumatic tire having sipes of given shape at given positions in the vulcanization with a sector mold without causing the breakage and deformation of a sipe-forming blade.

According to the invention, there is the provision of a pneumatic tire comprising plural island rows extending circumferentially of the tire or plural island rows each composed of blocks separated apart from each other in the circumferential direction of the tire at a given interval, which rows are defined in a surface of a tread by groove portions, and having sipes located at a given interval in the circumferential direction of the tire in at least one island row after the vulcanization with a sector mold consisting of plural arc-shaped segments, characterized in that in a group of sipes arranged at the same island row and having a periodicity in the circumferential direction and substantially the same shape, a depth of a sipe located in the vicinity of a position of a tread surface corresponding to an edge of each of the arc-shaped segments is made shallower than that of a sipe located at a position other than the above position.

In a preferred embodiment of the invention, the sipes formed in at least one island row have a maximum depth of not less than 8 mm provided that a maximum depth hs (mm) and a length in widthwise direction W (mm) of a sipe located in a zone ranging from a position of the tread surface corresponding to the edge of the arc-shaped segment within a range of not more than 3 mm in the circumferential direction of the tire among these sipes satisfy the following relationship:

when both ends of the sipe open to the groove portions, $hs \leq 7$;

when one end of the sipe opens to the groove portion, $hs \leq 7$ and $hs \times W \leq 70$; and when both ends of the sipe do not open to the groove portions, $hs \leq 7$ and $hs \times W \leq 42$.

BRIEF DESCRIPTION OF THE DRAWINGS

The invention will be described with reference to the accompanying drawings, wherein:

FIG. 1 is a partially schematic view of a tread pattern in an embodiment of the pneumatic tire according to the invention;

FIG. 2a-2c are a schematically plan view of a first embodiment illustrating the formation of sipes according to the invention;

FIG. 3a-3d are a schematically plan view of a second embodiment illustrating the formation of sipes according to the invention;

FIG. 4a-4c are a schematically plan view of a third embodiment illustrating the formation of sipes according to the invention;

FIG. 5 is a graph showing a deformation degree of a sipe; and

FIG. 6 is a schematically sectional view of the conventional sector mold.

DESCRIPTION OF THE PREFERRED EMBODIMENTS

In the pneumatic tire according to the invention, the maximum depth hs (mm) and the length in widthwise direction W (mm) of the sipe located in a zone ranging from a position of the tread surface corresponding to the edge of the arc-shaped segment within a range of not more than 3 mm in the circumferential direction of the tire are selected within given ranges, whereby the sipes can be formed at given positions with a given shape irrespectively of the vicinity of the tread surface corresponding to the edge of the arc-shaped segment.

Therefore, the tread pattern of this tire can sufficiently be uniformized in the circumferential direction of the tire, and also the function inherent to the sipe can sufficiently be developed.

The reason why the zone in the circumferential direction of the tire selecting the maximum depth Hs and length in the widthwise direction W of the sipe is limited to a range from the position of the tread surface corresponding to the edge of the arc-shaped segment to 3 mm is due to the fact that since the sector mold is generally a combination of 8–16 arc-shaped segments, if the zone exceeds 3 mm, the relative displacement of the sipe-forming blade with respect to the green tire in the circumferential direction can substantially be ignored and the external force acting to the sipe-forming blade is considerably decreased.

Even if a part of the sipe is included in the zone within 3 mm, it is preferable that at least a part of the sipe located in the zone satisfy the relationships of the maximum depth hs and the length in the widthwise direction W defined in the invention. Because, when only a part of the sipe is located in the zone within 3 mm by the bending of the sipe, a large external force in the circumferential direction of the tire acts to the blade forming such a part during the vulcanization.

Moreover, whether or not the sipe-forming blade is connected to a wide protrusion for the formation of the groove largely changes the bending strength and other strengths of the blade. Therefore, when the sipe formed in the island row of the tire is opened at both ends to the grooves defining the island row, both ends of the sipe-forming blade are connected to the wide protrusion for the formation of the groove, so that the strength of the sipe-forming blade increases to effectively prevent the deformation and breakage of the blade. In this case, therefore, only the maximum depth hs (mm) of the sipe is restricted to $hs \leq 7$, whereby the bending rigidity of the blade is sufficiently increased. When the maximum protruding length of the blade exceeds 7 mm, the bending rigidity of the blade itself is too low and the same problems as in the conventional technique are caused. That is, when it is not more than 7 mm, the bending rigidity is enhanced, whereby the breakage and deformation of the blade and the deformation of the sipe can effectively be prevented.

On the other hand, when both ends of the sipe are terminated in the island without being opened to the groove, both ends of the sipe-forming blade are not connected to the wide protrusion, so that the strength of the blade becomes very weak. In such a sipe, therefore, the maximum depth hs (mm) and the length in the widthwise direction W (mm) are restricted to $hs \leq 7$ and $hs \times W \leq 42$, whereby the protruding length of the blade is shortened to increase the rigidity of the blade and also the length in the widthwise direction of the blade is shortened to decrease the bending moment acting on the blade when placed in a green tire. Consequently the breakage and deformation of the blade is prevented more advantageously. Moreover, when $hs \times W$ exceeds 42, the deformations of the blade and sipe are often caused and finally the blade is broken.

Furthermore, when only one end of the sipe opens to the groove, one end of the sipe-forming blade is connected to the wide protrusion, the strength of the blade is between the above two cases. In such a sipe, therefore, the maximum depth hs (mm) and the length in the widthwise direction W (mm) are restricted to $hs \leq 7$ and $hs \times W \leq 70$. Since the upper limit of $hs \times W$ is 70, the bending moment acting to the sipe-forming blade becomes large as compared with the case of $hs \times W = 42$, but the blade is sufficiently durable to such an increase of the bending moment because one end of the blade is connected to the wide protrusion.

According to the invention, the sipes. Preferable extend substantially in the widthwise direction of the tire in order to sufficiently develop traction and braking performances on snow and ice road surfaces. In this case, it is favorable that an intersect angle of the sipe with respect to a straight line in the widthwise direction of the tire the within a range of 0°–30°.

Thus, in the tire according to the invention, the sipes are formed at given positions in the circumferential direction of the tire and hence the tread pattern can substantially be uniformized over the full circumference of the tire and the uneven wear and breakage of the block can sufficiently be prevented.

In FIG. 1 shows an embodiment of the tread pattern in the tire according to the invention.

Moreover, the internal reinforcing structure of the tire is the same as in the general-purpose radial tire, so that it is omitted in illustration.

In this embodiment, the green tire is vulcanized with a sector mold consisting of plural arc-shaped segments, preferably 8–16 segments, whereby six circumferential grooves 1–3 extending zigzag in the circumferential direction of the tire and plural lateral grooves 4 extending from one tread end to the other tread end across the circumferential grooves 1–3 are formed to provide seven island rows comprised of blocks 5–8 defined by the circumferential grooves 1–3, tread ends and lateral grooves 4, or seven block rows 9–12.

During the vulcanization with the sector mold, sipes 13–15 extending in the widthwise direction of the tire are formed in each of the respective blocks 5–7 at the block rows 9–11 other than the shoulder block rows 12. One sipe per one block is formed by sipe-forming blades disposed on the inner peripheral surface of each of the arc-shaped segments so as to protrude inward in the radial direction. In this case, each of the sipes 13–15 has a maximum depth of not less than 8 mm, (11 mm in the illustrated embodiment).

In this embodiment, sipes located in a zone Z ranging from a position of a tread surface corresponding to the edge of each arc-shaped segment or a position X—X shown by phantom line to 3 mm in the circumferential direction of the tire, i.e. sipes 14a, 15a at least partially existing in the zone Z have a maximum depth hs (mm) of $hs \leq 7$.

Moreover, the minimum value of the maximum depth hs is 2 mm because when the depth is less than 2 mm, the function inherent to the sipe can not effectively be developed.

When both ends of the sipe are opened to the grooves as in the illustrated embodiment, various shapes may properly be selected. For example, the shape of the sipe may be slanted or step wise as shown in FIGS. 2a and 2b. Furthermore, when the island is a rib as shown in FIG. 2c, both end opened sipe may take various shapes including a straight line as illustrated.

When the sipe located in the zone Z ranging from the position X—X within 3 mm is opened at one end to the groove as shown in FIG. 3, the maximum depth hs (mm) and the length in widthwise direction W (mm) of the sipe are selected within ranges of $hs \leq 7$ and $hs \times W \leq 70$.

When both ends of the sipe located in the zone Z ranging from the position X—X within 3 mm are terminated in the island as shown in FIG. 4, the maximum depth hs (mm) and the length in widthwise direction W (mm) of the sipe are selected within ranges of $hs \leq 7$ and $hs \times W \leq 42$.

As seen from the above, the rigidity of the blade is increased with the shortening of the protruding length of the blade and also the bending moment acting the blade in connection with the strength of the blade itself is effectively reduced, whereby the deformation and breakage of the blade are effectively prevented.

Ten tires having a tire size of 10.00 R20 were manufactured with a sector mold consisting of 8 arc-shaped segments by varying the maximum depth hs (mm) and length in the widthwise direction W (mm) of a sipe as to each of both end opened sipe, one end opened sipe and both end closed sipe, and thereafter the deformation degree of the sipe located in the zone ranging from the position of the tread surface corresponding to the edge of the arc-shaped segment within 3 mm was observed to obtain results as shown in FIG. 5.

In FIG. 5, symbol A shows a case where the deformation of the sipe is zero for all ten vulcanized tires, and symbol B shows a case where the sipe having a maximum deformation of less than 1 mm exist is two among the ten tires, and symbol C shows a case where the sipe having a maximum deformation of not less than 1 mm exist in two among the ten tires and the blade is broken.

As seen from FIG. 5, in case of the both end opened sipe, when the length in the direction W is 30 mm, the deformation of the sipe is sufficiently prevented till the maximum depth hs of the sipe reaches to 7 mm, while when the maximum depth hs is 9 mm, even if the length in the widthwise direction W is shortened to 20 mm, the deformation of the sipe cannot completely be prevented.

In case of the one end opened sipe, when the length in the widthwise direction W is 15 mm, if the maximum depth hs is 4 mm, there is no problem, but if the maximum depth hs is 7 mm, there is a fear of causing maximum deformation of less than 1 mm in the sipe. Further, when the length in the widthwise direction W is 10 mm, even if the maximum depth hs is 7 mm ($hs \times W = 70$), the deformation of the sipe can sufficiently be prevented, but if the maximum depth hs is 9 mm ($hs \times W = 90$), there is a fear of causing maximum deformation of less than 1 mm in the sipe.

In case of the both end closed sipe, when the length in the widthwise direction W is 10 mm, if the maximum depth hs is 7 mm ($hs \times W = 70$), there is a fear of causing maximum deformation of less than 1 mm in the sipe, while when the length in the widthwise direction W is 6 mm, if the maximum depth hs is 7 mm ($hs \times W = 42$), there is no problem, but if the maximum depth hs is 9 mm ($hs \times W = 54$), there is a fear of causing the above deformation.

As mentioned above, according to the invention, the sipes of given shape can be formed at given positions in the island portion of the tread, and also the breakage of the sipe-forming blade and the like can effectively be prevented.

What is claimed is:

1. A pneumatic tire comprising a plurality of tire tread segments formed by a sector mold having 8-16 arc-shaped segments corresponding to said tire tread segments, each of said tire tread segments comprising a plurality of island rows that are defined in a surface of the tread of the tire, each row being composed of blocks separated from each other in the circumferential direction of the tire at a given internal, at least one of the island rows having sipes of substantially the same shape formed therein and being located at a given interval and having a periodicity in the circumferential direction, wherein a depth of a sipe located near an edge of each of the tire tread segments is shallower than that of all other sipes of similar shape and configuration located at other positions on the tire tread segment.

2. The pneumatic tire according to claim 1, wherein said sipe has a maximum depth of not less than 8 mm provided that a maximum depth hs (mm) and a length in a widthwise direction W (mm) of a sipe located in a zone ranging from a position of the thread surface corresponding to an edge of a tire tread segment to within a range of not more than 3 mm in the circumferential direction of the tire among said sipes satisfy the following relationship:

when both ends of the sipe open to the groove portions $hs \leq 7$ mm;

when one end of the sipe opens to the groove portion, $hs \leq 7$ mm and $hs \times W \leq 70$ mm$^2$; and when both ends of the sipe do not open to the groove portions, $hs \leq 7$ mm and $hs \times W \leq 42$ mm$^2$.

3. The pneumatic tire according to claim 2, wherein said maximum depth hs is not less than 2 mm.

4. The pneumatic tire according to claim 1, wherein said sipe has an intersect angle of 0°-30° with respect to an axial direction of the tire.

* * * * *